Patented Mar. 18, 1941

2,235,782

UNITED STATES PATENT OFFICE 2,235,782

SOLUBLE CO-POLYMERS OF VINYL CHLORIDE AND VINYLIDENE CHLORIDE

Ralph M. Wiley, Midland, Mich., assignor to The Dow Chemical Company, Midland, Mich., a corporation of Michigan No Drawing. Application April 1, 1939, Serial No. 265,512

3 Claims. (Cl. 260—86)

This invention relates to certain co-polymers of vinyl chloride and vinylidene chloride, and particularly to those which have low softening points and are readily soluble in certain organic solvents.

In a co-pending application, Serial No. 88,403, filed July 1, 1936, now U. S. Patent No. 2,160,931, of which the present application is a continuation-in-part, there are described many of the co-polymers of vinylidene chloride (unsymmetrical dichloroethylene) and vinyl chloride. The co-polymers claimed in the co-pending application contain from 5 to 30 per cent of vinyl chloride and correspondingly from 95 to 70 per cent of vinylidene chloride. They are substantially unaffected by organic solvents and by most acids, bases, and oxidizing agents at room temperature.

For many purposes it is desirable to have a resinous product which is resistant to attack by acids, bases and oxidizing agents at room temperature and which will dissolve in common solvents to provide lacquer solutions. It is also desirable to obtain resinous polymer products having low softening points, e. g. below 100° C., which may be molded to produce useful articles at temperatures available from low pressure steam, i. e. temperatures near 100°-110° C., or lower.

It is accordingly among the objects of the present invention to provide moldable co-polymers of vinyl chloride and vinylidene chloride in proportions such that the product has a softening point below 100° C. It is a further object to provide such co-polymers which are readily soluble in common organic solvents at moderate temperatures to provide useful solutions.

According to the invention the foregoing and related objects may be attained by polymerizing together mixtures of the monomers of vinyl chloride and vinylidene chloride, in the presence of a polymerization catalyst such as benzoyl peroxide, in proportions varying from about 45 to about 85 per cent vinyl chloride and correspondingly from about 55 to about 15 per cent of vinylidene chloride. The products so obtained, herein referred to as co-polymers, contain from about 40 to about 85 per cent of vinyl chloride co-polymerized with from 60 to 15 per cent of vinylidene chloride, all have softening points below 100° C., and are all soluble in common non-polar organic solvents including dioxane, benzene, toluene, xylene, trichloroethane, acetylene tetrachloride, cyclohexanone, orthodichlorobenzene, trichlorobenzene, or mixtures thereof. In common with the co-polymers of my U. S. Patent No. 2,160,931 mentioned above, they are entirely insoluble in aliphatic hydrocarbons, but unlike those co-polymers, they form solutions in organic solvents which may be diluted or "thinned" with petroleum naphthas.

In order to provide a basis for defining the solubility of the new co-polymers in a precise manner, the following laboratory test has been developed: 1 gram of the co-polymer is dissolved in 25 cc. of dioxane, and this solution is diluted with 25 cc. of petroleum ether which is a non-solvent for the co-polymer. Any precipitate which may be formed is removed from the solution by filtration, is dried and weighed, and its weight subtracted from that of the original sample. The amount remaining in solution is computed as per cent of the original, and in the table which follows is reported as "Solubility, per cent."

A series of co-polymers were prepared by polymerizing together mixtures of vinylidene chloride and vinyl chloride, all from the same batches of the two monomers. The mixture of monomers in successive runs differed in composition by increments of 5 per cent, as shown in the following table. The co-polymers were freed from remaining monomer and were tested for softening point and "Solubility," as described above.

Table

| Mixture of monomers | | Properties of co-polymer | |
|---|---|---|---|
| Vinyl chloride | Vinylidene chloride | Softening point | "Solubility,"[1] |
| Per cent | Per cent | °C. | Per cent |
| 0 | 100 | 190 | 0 |
| 5 | 95 | 180 | 0 |
| 10 | 90 | 174 | 0 |
| 15 | 85 | 166 | 1 |
| 20 | 80 | 160 | 9 |
| 25 | 75 | 154 | 12 |
| 30 | 70 | 147 | 15 |
| 35 | 65 | 136 | 17 |
| 40 | 60 | 126 | 22 |
| 45 | 55 | 88 | 55 |
| 50 | 50 | 80 | 93 |
| 55 | 45 | 80 | 90 |
| 60 | 40 | 80 | 85 |
| 65 | 35 | 80 | 74 |
| 70 | 30 | 80 | 63 |
| 75 | 25 | 84 | 53 |
| 80 | 20 | 90 | 44 |
| 85 | 15 | 98 | 36 |
| 90 | 10 | 117 | 27 |
| 95 | 5 | 130 | 17 |
| 100 | 0 | 180 | 5 |

[1] Solubility test defined above.

Reference to the table shows that the co-polymers prepared from mixtures of from about 45 to about 85 per cent of vinyl chloride, and correspondingly from about 55 to about 15 per cent of vinylidene chloride all have softening points below 100° C. and all are at least 30 per cent soluble in the 50-50 dioxane-petroleum ether mixture employed in the previously defined solubility test. The new products differ remarkably from the polymers of either vinyl chloride alone or of vinylidene chloride alone, as these polymers soften at 180° C. or above, and remain dissolved only to the extent of 5 per cent or less in the solubility test employed.

Standard solutions of the new co-polymers in solvents such as orthodichlorobenzene or in hot methyl amyl ketone have lower viscosities than have like solutions of the co-polymers which contain less than 45 or more than 85 per cent of vinyl chloride. It is thus possible to provide solutions of fairly high concentrations which are still of low enough viscosity to be brushed or sprayed.

The following examples illustrate the practice of the invention:

*Example 1*

To 50 parts of vinyl chloride and 50 parts of vinylidene chloride is added 1 part of benzoyl peroxide as a catalyst. The mixture of monomers is polymerized in a glass container at 45° C. over a period of about 2 weeks. When freed from remaining monomer the product is a soft, somewhat rubbery material which may be stretched and then exhibits a slow partial return to its original form. It is soluble in dioxane and in such aromatic solvents as benzene, toluene, and xylene. Films cast from solutions of the co-polymer are characterized by a very low permeability to water and by high resistance to attack by aqueous solutions of acids, alkalies (except ammonia) and oxidizing agents. Solutions of the polymer have considerable tolerance for non-solvents, partial solvents or thinners and can be employed as lacquers.

*Example 2*

25 parts of vinylidene chloride and 75 parts of vinyl chloride are polymerized in the presence of 1 part of benzoyl peroxide at 45° C. over a period of about 10 days. The polymer gradually separates from the monomers and collects on the bottom of the container as a clear, colorless or slightly amber layer which increases slowly in volume until the whole mass is solid. When remaining monomer is removed from the polymeric product, there remains a clear mass which is hard and brittle, and soluble in dioxane and aromatic solvents, although somewhat less soluble than the product described in Example 1. This polymer is considerably more soluble than the polymer of either vinyl chloride or vinylidene chloride alone and is correspondingly more compatible with plasticizers than are the said polymers. The co-polymer may be modified in its physical properties by the incorporation of plasticizers, heat stabilizing agents, and the like.

The new co-polymers softening at temperatures below 100° C. may be advantageously employed as coatings for cloth, paper, or metals. The said coatings may be applied either from solutions of the co-polymer or from the molten co-polymer in the manner customary in the coating of such articles. Films of the co-polymer, when applied to metal surfaces, may be made to adhere particularly well by baking the coated surface at temperatures near or slightly above the softening points of the co-polymers for a period of from 5 minutes to an hour. The co-polymers may be employed as cable coatings and are especially suited for use in the insulation of marine cables due to their extremely low permeability to water, coupled with good flexibility and resistance to attack by aqueous brines and chemical solutions.

Other modes of applying the principle of my invention may be employed instead of those explained, change being made as regards the materials employed, provided the step or steps or the products recited in the following claims be thereby carried out or obtained.

I therefore particularly point out and distinctly claim as my invention:

1. The method which comprises reacting together under polymerizing conditions a mixture of from about 45 to about 85 parts of the monomer of vinyl chloride and corresponding from about 55 to about 15 parts of the monomer of vinylidene chloride to produce a co-polymeric body having a softening point below 100° C. and a solubility of at least 30 per cent as determined by retention in solution in a solubility test, wherein 1 gram of the co-polymer is dissolved in 25 cc. of dioxane and diluted with 25 cc. of petroleum ether.

2. A co-polymer of from about 40 to about 85 per cent of vinyl chloride and correspondingly from about 60 to about 15 per cent of vinylidene chloride, characterized by having a softening point below 100° C.

3. The method which comprises reacting together under polymerizing conditions a mixture of from about 45 to about 85 parts of the monomer of vinyl chloride and correspondingly from about 55 to about 15 parts of the monomer of vinylidene chloride.

RALPH M. WILEY.